(12) United States Patent
Cho et al.

(10) Patent No.: US 8,335,185 B2
(45) Date of Patent: Dec. 18, 2012

(54) METHOD OF ALLOCATING RESOURCE FOR MOBILE STATION TO SUPPORT REAL TIME SERVICE

(75) Inventors: Hee Jeong Cho, Gyeonggi-do (KR); Ki Seon Ryu, Gyeonggi-do (KR); Ae Ran Youn, Gyeonggi-do (KR); Tae Gon Kong, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 197 days.

(21) Appl. No.: 12/743,552

(22) PCT Filed: Nov. 5, 2008

(86) PCT No.: PCT/KR2008/006504
§ 371 (c)(1),
(2), (4) Date: May 20, 2010

(87) PCT Pub. No.: WO2009/066884
PCT Pub. Date: May 28, 2009

(65) Prior Publication Data
US 2010/0254332 A1   Oct. 7, 2010

(30) Foreign Application Priority Data
Nov. 20, 2007   (KR) .................. 10-2007-0118614

(51) Int. Cl.
*H04W 4/00* (2009.01)
(52) U.S. Cl. ...................................... 370/329
(58) Field of Classification Search .......... 370/203, 370/204–215, 229–240, 310–337, 338–350, 370/351–394, 395.1, 395.3, 395.4, 395.41, 370/395.42, 395.5, 395.52, 395.53, 412–421, 370/431–457, 458–463, 464–497, 498–529
See application file for complete search history.

(56) References Cited

U.S. PATENT DOCUMENTS

| | | | |
|---|---|---|---|
| 7,242,694 B2 | 7/2007 | Beser | |
| 2007/0093252 A1 | 4/2007 | Rahman et al. | |
| 2007/0206561 A1* | 9/2007 | Son et al. | 370/346 |
| 2009/0075667 A1* | 3/2009 | Bourlas | 455/452.1 |
| 2009/0111473 A1* | 4/2009 | Tao et al. | 455/440 |
| 2010/0254332 A1* | 10/2010 | Cho et al. | 370/329 |

FOREIGN PATENT DOCUMENTS
KR   10-2007-0052019   5/2007

* cited by examiner

*Primary Examiner* — Kwang B Yao
*Assistant Examiner* — Jung-Jen Liu
(74) *Attorney, Agent, or Firm* — Lee, Hong, Degerman, Kang & Waimey

(57) ABSTRACT

A method of efficiently allocating a resource to a mobile station to support a real time service in a radio access system is provided. The method includes grouping one or more mobile stations and allocating a group resource area for transmitting bandwidth request information for transmitting real time service data of the grouped one or more mobile stations, and allocating respective individual resource areas of the one or more mobile stations included in the group resource area. Since the method of grouping the mobile service and efficiently allocating an uplink resource are provided, it is possible to reduce message overhead and efficiently use the resource.

10 Claims, 10 Drawing Sheets

[Fig. 1]
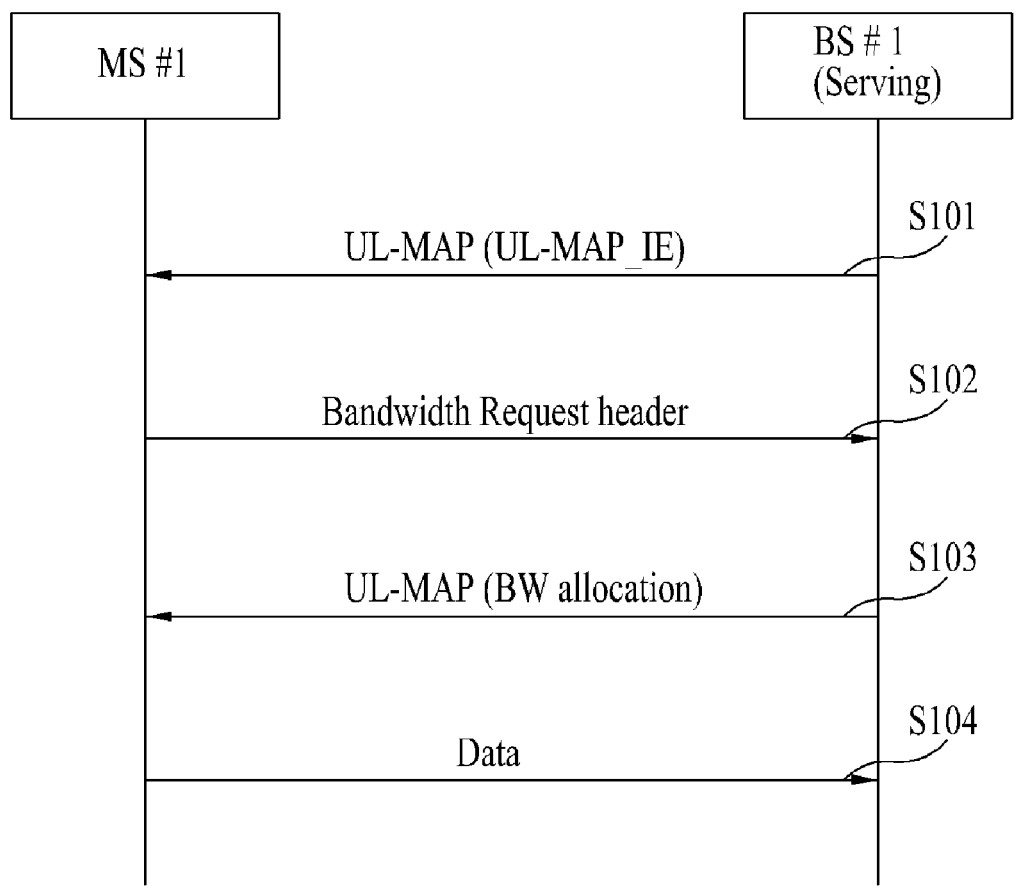

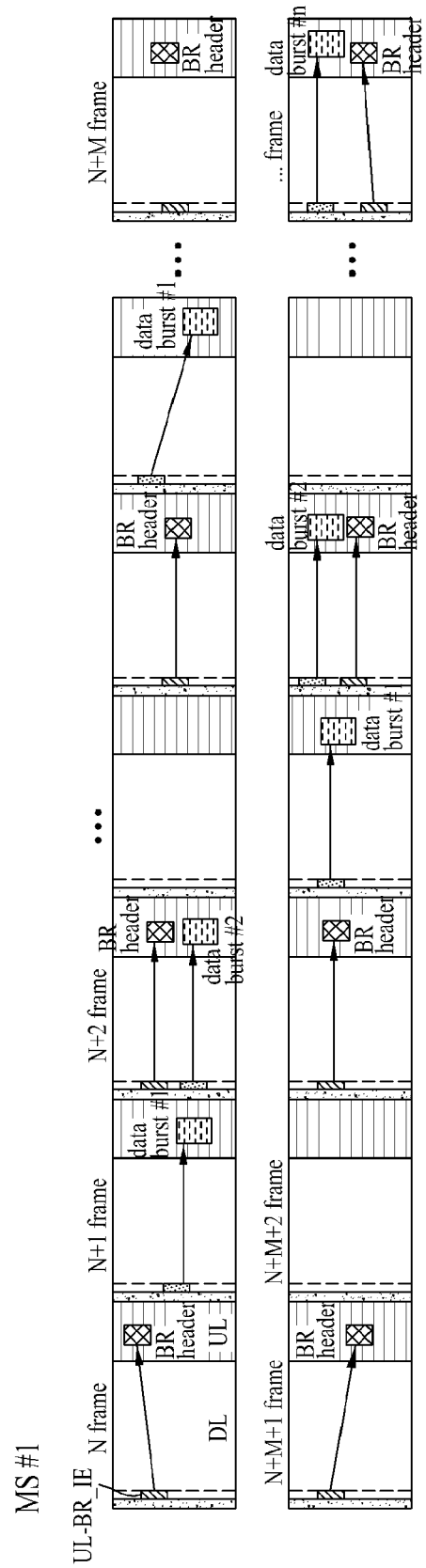
[Fig. 2]

[Fig. 3]
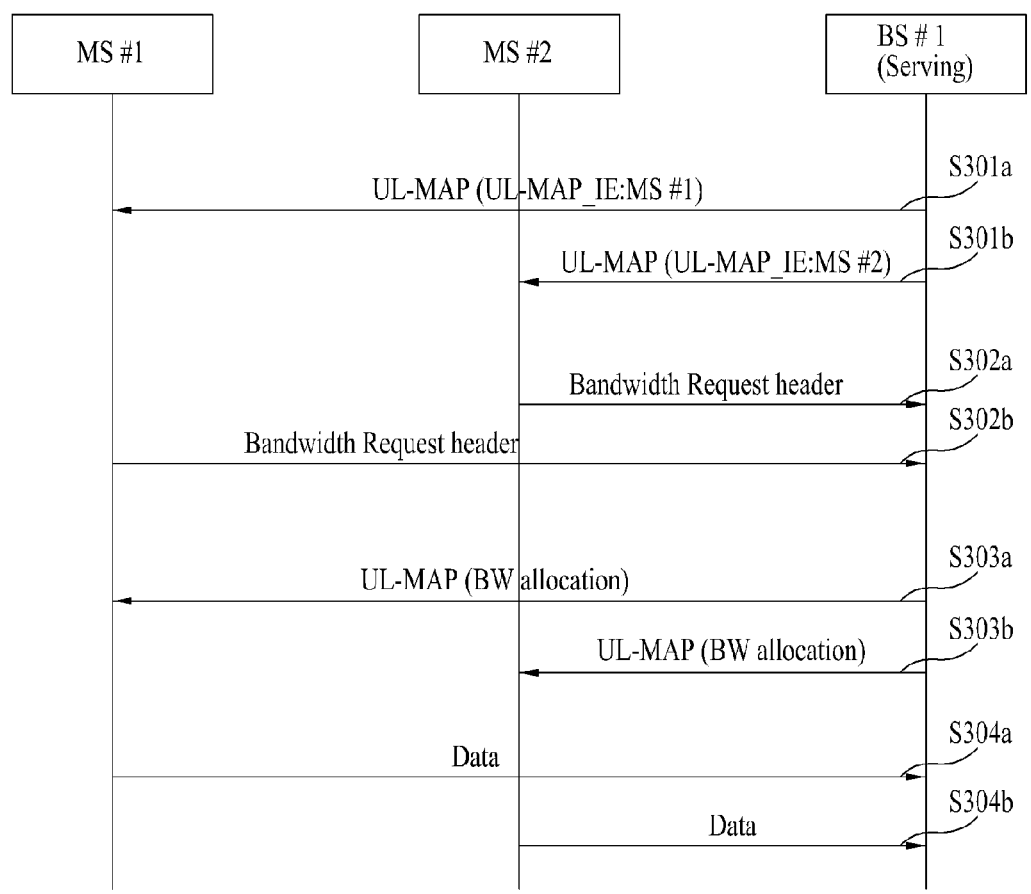

[Fig. 4]
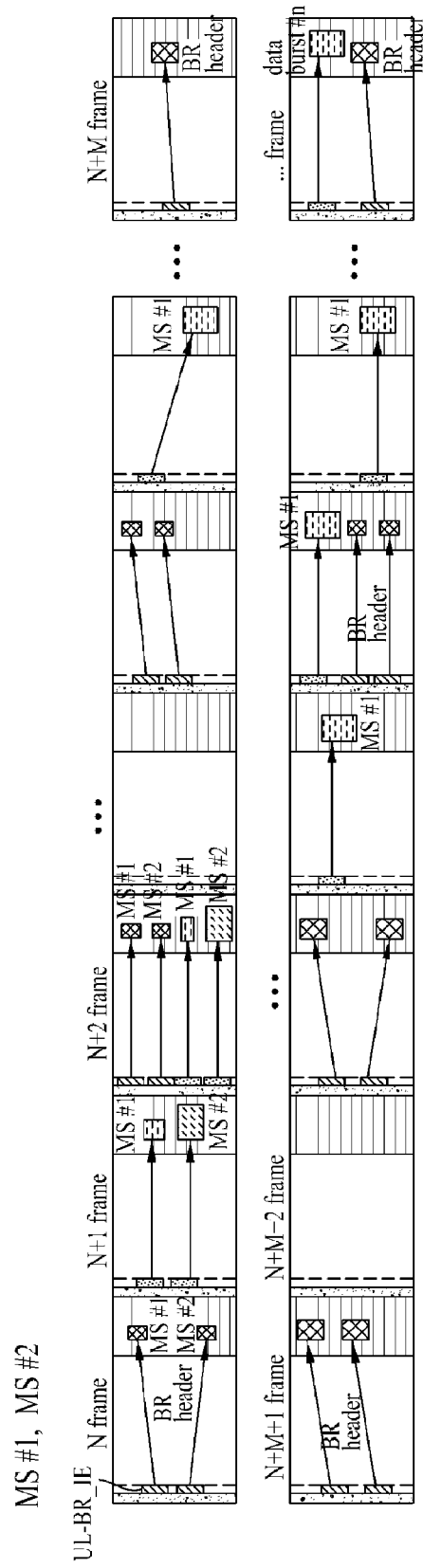

[Fig. 5]
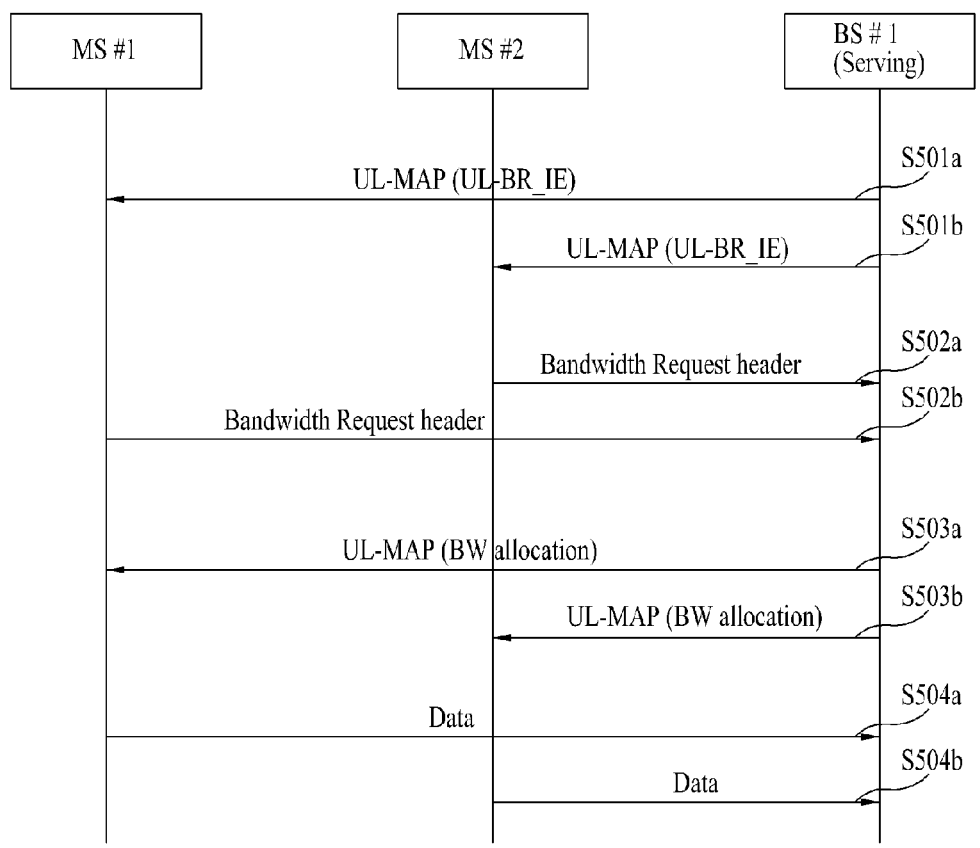

[Fig. 6]
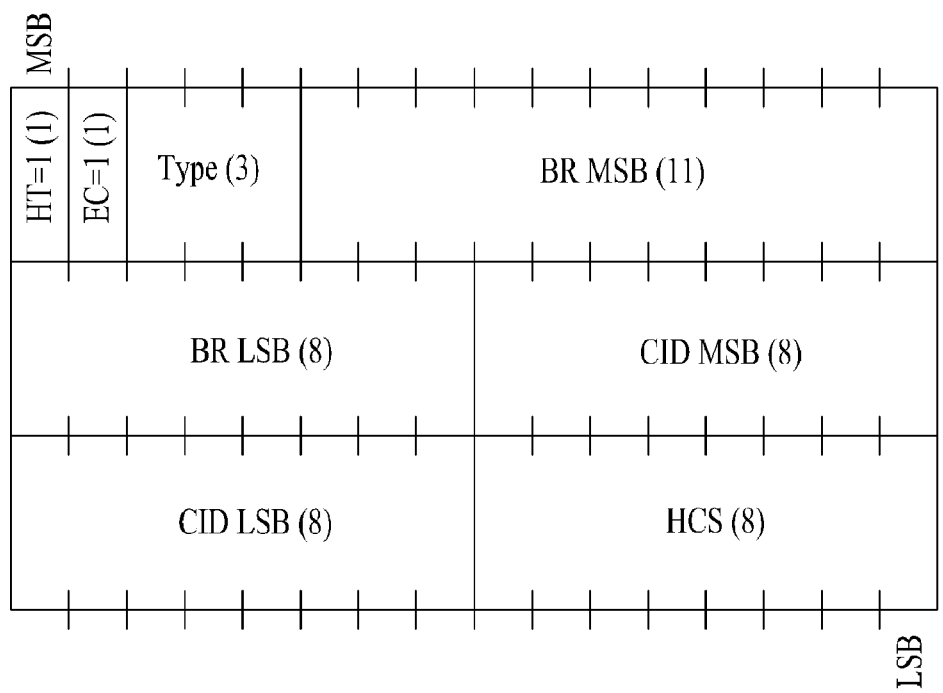

[Fig. 7]
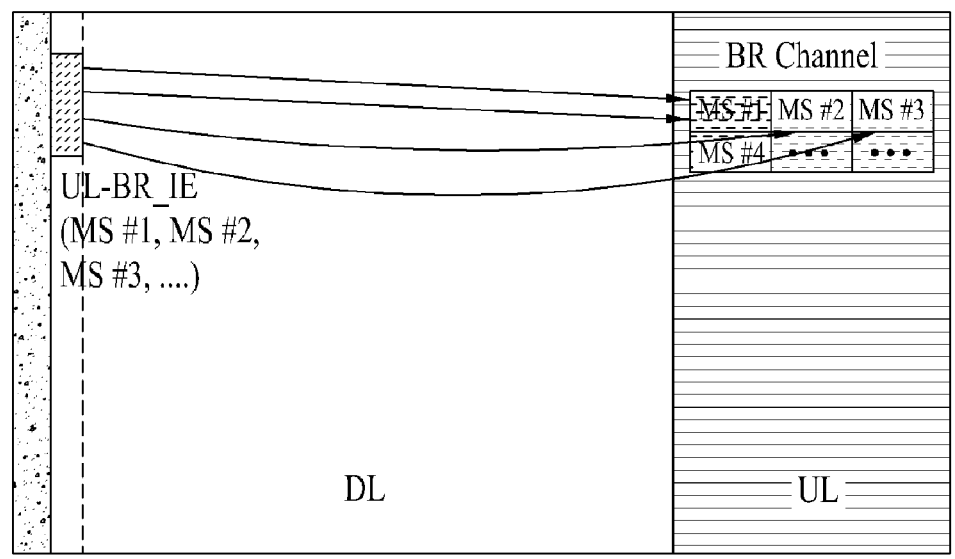

[Fig. 8]
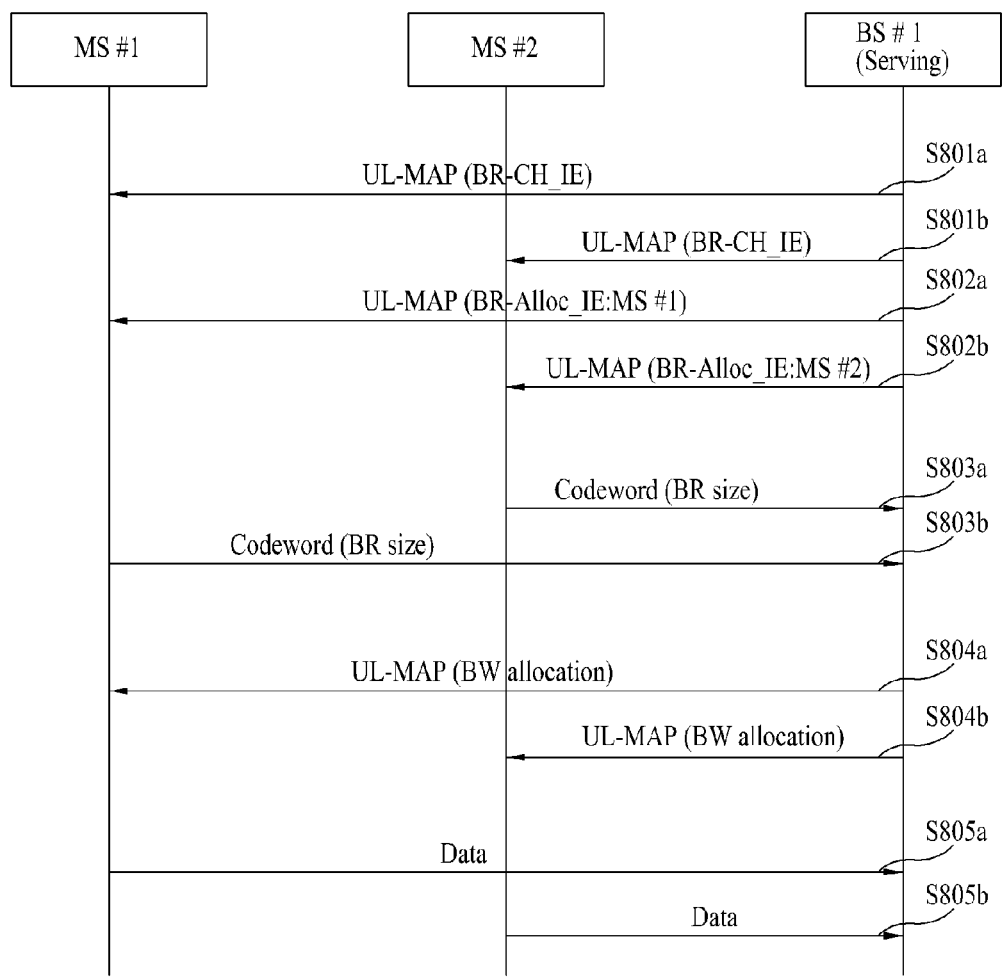

[Fig. 9]
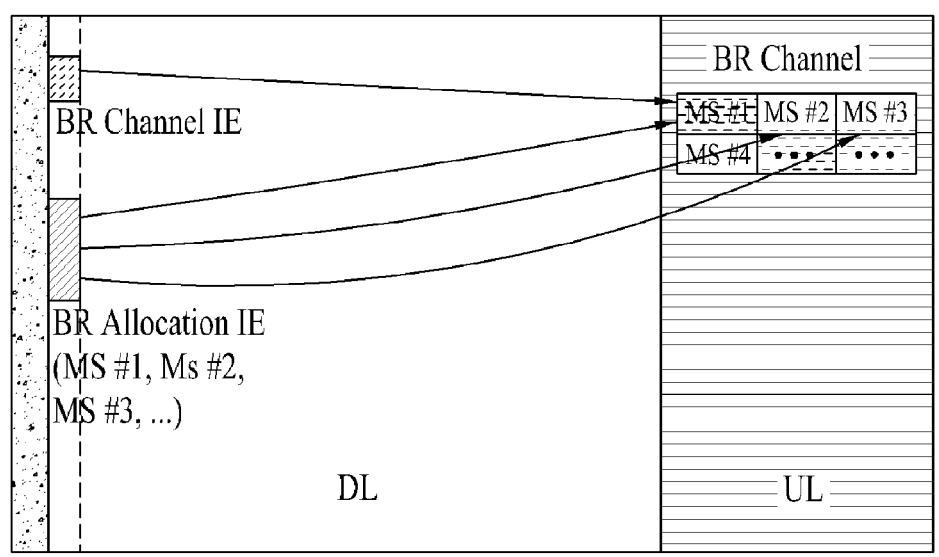

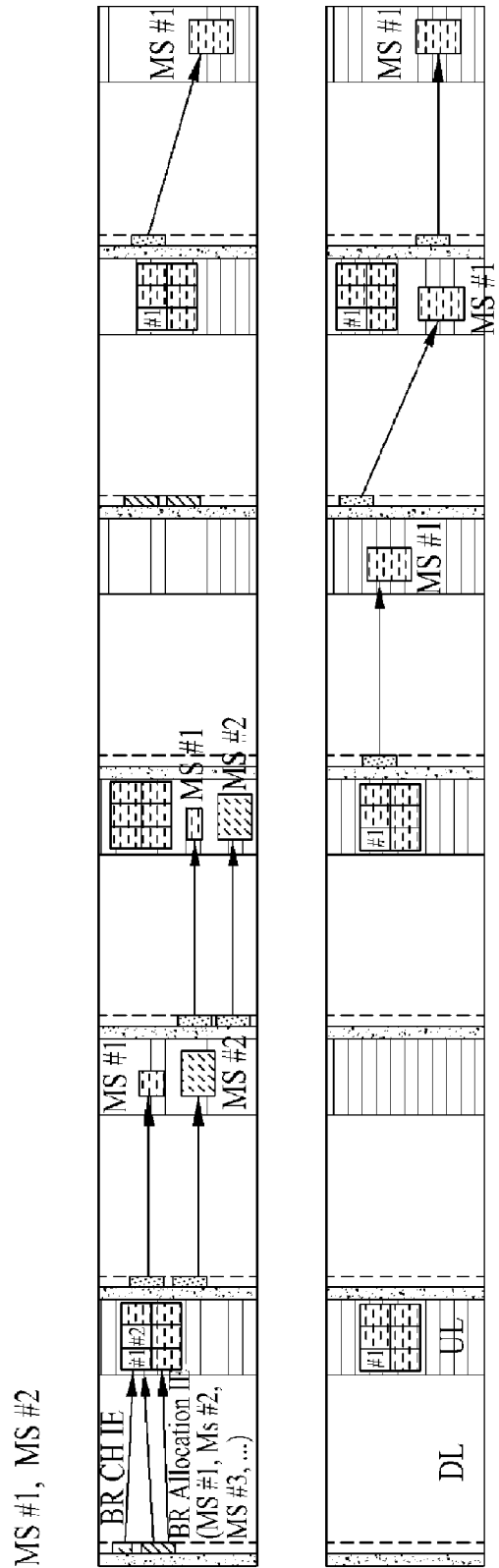
[Fig. 10]

METHOD OF ALLOCATING RESOURCE FOR MOBILE STATION TO SUPPORT REAL TIME SERVICE

CROSS-REFERENCE TO RELATED APPLICATIONS

This application is the National Stage filing under 35 U.S.C. 371 of International Application No. PCT/KR2008/006504, filed on Nov. 5, 2008, which claims the benefit of earlier filing date and right of priority to Korean Application No. 10-2007-0118614, filed on Nov. 20, 2007.

TECHNICAL FIELD

The present invention relates to a method of efficiently allocating a resource to a mobile station to support a real time service in a radio access system.

BACKGROUND ART

Hereinafter, a scheduling service used in a general radio access system will be described. In addition, a method of requesting a bandwidth will be described.

The scheduling service is a service for requesting an uplink bandwidth and efficiently allocating a resource according to the request. In addition, the scheduling service indicates a data processing method supported by a medium access control (MAC) scheduler when data is delivered by a connection. The connection between a base station and a mobile station is associated with one scheduling service. The scheduling service may be defined by a series of quality of service (QoS) parameters for performing a service operation.

The scheduling service includes outbound transmission scheduling and uplink request/grant scheduling.

The outbound transmission scheduling indicates that a specific frame is selected or a bandwidth is allocated in order to transmit data. The outbound transmission scheduling may be performed by a base station (e.g., in downlink) or a mobile station (e.g., in uplink).

The uplink request/grant scheduling is performed by a base station in order to provide a bandwidth for an uplink transmission to a mobile station or provide an opportunity for requesting a bandwidth to a mobile station. If a scheduling type and QoS parameters associated therewith are specified, a base station scheduler may estimate an uplink traffic throughput and a necessary standby time and provide a poll or a grant at an adequate time.

The uplink request/grant scheduling type includes an unsolicited grant service (UGS) type, a real time polling service (rtPS) type, a non-real time polling service (nrtPS) type and a best effort service (BE) type.

The UGS is designed so as to support a real time uplink service flow for periodically generating a data packet having a predetermined size. For example, the UGS includes a voice over Internet protocol (VoIP) without silence suppression or a T1/E1. In addition, the USG may periodically allocate a slot having a fixed size without a separate contention or request. That is, the USG fixedly allocates a bandwidth to a mobile station so as to guarantee a constant resource.

The rtPS is designed so as to support a real time uplink service flow function for periodically generating data packets having variable lengths, such as a video phone or a moving pictures experts group (MPEG) video. The rtPS may periodically provide real time unicast request opportunities to a mobile station. In addition, the rtPS satisfies a real time requirement of a service flow and allows the mobile station to specify a desired resource size on the basis of the real time requirement. At this time, the mobile station may use a given request opportunity and cannot make a request using contention.

The nrtPS periodically provides a unicast poll function and can guarantee an uplink service flow to receive a request opportunity even in a communication network congestion state. Generally, a base station polls nrtPS connection identifiers (CIDs) at an interval of 1 second or less. The nrtPS is used for burst non-real time data traffic having a variable size, such as file transfer requiring a high bandwidth.

The object of the BE grant scheduling is to provide an efficient service for best effort traffic. The BE service allows a mobile station to use a request opportunity based on contention. Accordingly, the mobile station may use the request opportunity based on contention, a unicast request opportunity and a data transmission opportunity.

In the present specification, among the uplink request/grant scheduling services, for example, the rtPS will be described. Other scheduling services may be used and may be differently applied according to the requirement of a system.

Hereinafter, a bandwidth allocation and request mechanism will be briefly described.

A request function is used by mobile stations in order to inform a base station that the mobile stations require an uplink bandwidth allocation. In a general wideband radio access system, a method of requesting a bandwidth includes a basic request method and a random access request method.

In the basic request method, a mobile station requests an uplink bandwidth allocation in unicast by polling of a base station. In addition, the mobile station may piggyback the residual area of the bandwidth previously allocated by the base station and request an uplink bandwidth.

In the random access request method, a plurality of mobile stations contentiously transmits bandwidth request messages via one uplink channel based on contention such that the uplink bandwidths are allocated.

The polling indicates an MAC scheme for sequentially or periodically checking whether or not data which will be transmitted by devices commonly using one communication line is present. In particular, the polling scheme of wireless communication indicates an MAC scheme for allowing a base station to sequentially check whether or not transmission requests of mobile stations are made and allowing the transmission to the requesting mobile station.

That is, the polling is used to allow a base station to specially allocate uplink bandwidths to mobile stations. The bandwidth allocating method may be performed in the form of a series of information elements (IEs) included in an uplink map (UL-MAP), instead of in the form of a message. Generally, the polling may be performed in the unit of mobile stations. The bandwidth is always requested in the unit of connection identifiers (CIDs) and is allocated in the unit of mobile stations.

FIG. 1 is a view showing an example of a unicast polling method used generally.

The rtPS used in FIG. 1 is an uplink scheduling type service in which a mobile station periodically requests data having a variable size in real time, such as an MPEG video.

Referring to FIG. 1, a base station (serving BS #1) performs unicast polling to a mobile station (MS #1) in downlink to support the rtPS. That is, the base station allocates an uplink resource, which is used by the mobile station for requesting a bandwidth, to the mobile station using a UL-MAP (UL-MAP_IE) message. At this time, the UL-MAP message may be periodically transmitted, and the period thereof may be a value set in a process (dynamic service addition (DSA) process) of generating a service flow (S101).

The mobile station requests the bandwidth corresponding to the size of a data packet, which will be transmitted from the mobile station to the base station, to the base station via the uplink resource allocated in the step S101. At this time, the mobile station may use a bandwidth request (BR) header in order to request the bandwidth (S102).

The base station, which receives the request for the bandwidth for transmitting the uplink data packet from the mobile station, allocates the uplink resource to the mobile station if the bandwidth requested by the mobile station can be allocated (S103).

The mobile station which receives the bandwidth for the uplink area allocated by the base station may transmit uplink data to the base station via the allocated transmission area (S104).

That is, generally, the mobile station which receives the rtPS may request and receive the uplink resource by the procedure shown in FIG. 1.

FIG. 2 is a view showing a resource allocating method for requesting a bandwidth according to the sequence of frames if the number of mobile stations which receive the rtPS is one and an uplink resource allocation period is 2.

In FIG. 2, a horizontal axis shows a frame unit with time and a vertical axis shows a subchannel unit according to a frequency. One frame may include a downlink channel and an uplink channel.

Referring to FIG. 2, a base station allocates an uplink channel (burst) for requesting a bandwidth to a mobile station in downlink at an Nth frame. The mobile station may transmit a BR header to the base station via the uplink channel (burst) allocated by the base station at the Nth frame.

The base station allocates an uplink bandwidth for transmitting data from the mobile station to the base station to the mobile station in downlink at an N+1th frame. The mobile station may transmit data (data burst #1) to the base station via the uplink bandwidth allocated by the base station at the N+1th frame.

The mobile station may subsequently transmit data (data burst #2) to the base station via the uplink bandwidth. At this time, the base station may periodically perform polling. That is, the base station periodically allocates the uplink bandwidth for requesting the bandwidth to the mobile station in downlink. Accordingly, the base station allocates an uplink resource for transmitting a BR header to the mobile station even at an N+2th frame. At this time, if uplink data which will be transmitted from the mobile station to the base station is not present, the bandwidth may not be requested.

In addition, the base station may periodically repeat the process of allocating the resource area for requesting the bandwidth. The mobile station which receives the rtPS by the above-described method may periodically receive the uplink resource allocated by the base station.

FIG. 3 is a view showing another example of the unicast polling method used generally.

FIG. 3 shows an uplink allocating process for supporting the rtPS. At this time, in a base station (serving BS #1), one or more mobile stations which receive the rtPS may exist. In the present specification, it is assumed that two mobile stations (MS #1 and MS #2) which receive the rtPS exist. In FIG. 3, the same reference numerals denote the same steps, and suffixes a and b respectively denote the identifiers of the messages of the mobile stations.

The base station transmits UL-MAP messages including UL-MAP_IE to the first mobile station #1 and the second mobile station #2 in downlink (S301a and S301b).

In the step S301, the UL-MAP_IE included in each UL-MAP message is uplink map information for allocating a resource area for requesting an uplink bandwidth to each mobile station. Since the UL-MAP_IE transmitted to each mobile station has 32 bits, the base station should use 64 bits (32 bits*number of mobile stations) in order to allocate the uplink resource areas to the two mobile stations.

At this time, if the number of mobile stations which receives the rtPS is increased, the base station should allocate the uplink resource areas for requesting the bandwidth to the mobile stations by the increased number of mobile stations. Accordingly, overhead due to the transmission of the UL-MAP messages by the base station is increased in proportion to the number of mobile stations.

If uplink data which will be transmitted from the mobile stations to the base station is present, BR headers (48 bits) are transmitted to the base station via the uplink resource areas allocated to the mobile stations at an Nth frame (S302a and S302b). In the step S302, the BR headers are used for requesting the bandwidth corresponding to the size of data which will be transmitted from the mobile stations to the base station.

The base station receives the BR headers from the first mobile station in the step S302 and the second mobile station and determines whether or not the bandwidths are allocated. The base station transmits UL-MAP (BW allocation) messages including resource area information for allocating the bandwidths to the mobile stations to the mobile stations at an N+1th frame (S303a and S303b).

The mobile stations receive the respective uplink bandwidths from the base station via the UL-MAP messages. Accordingly, the mobile stations may transmit uplink data to the base station via the allocated transmission areas at the N+1th frame (S304a and S304b).

If the uplink data which will be transmitted to the base station is not present, the mobile stations set the BR areas of the BR headers to 0 and transmit the BR headers to the base station. Then, the uplink allocating process is finished and the steps S303 and S304 may be omitted.

At this time, the BR may indicate the size of the data which will be transmitted by the mobile station. The steps S301 to S304 may be performed in a period (or at an interval) set in the process of generating the service flow.

FIG. 4 is a view showing a resource allocating method according to the sequence of frames if the number of mobile stations which receive the rtPS is two and a polling period is 2.

FIG. 4 shows the method of allocating the uplink resource by the method of FIG. 3 according to the sequence of frames. In FIG. 4, the base station (serving BS) transmits the UL-MAP messages including UL-MAP_IE to the first mobile station (MS #1) and the second mobile station (MS #2) at the Nth frame. At this time, the UL-MAP_IE specifies the resource area for requesting the uplink bandwidth to the base station by the mobile station if the data which will be transmitted from the mobile station to the base station is present. The UL-MAP_IE of each mobile station has a size of 32 bits. Accordingly, if two mobile stations are present, the base station uses 64 bits (32 bits*number of mobile stations).

If two or more mobile stations which receive the rtPS are present, overhead which occurs in the base station is increased in proportion to the number of mobile stations when the base station transmits the UL-MAP messages.

Each mobile station may request a bandwidth for transmitting data to the base station via the uplink area received by each UL-MAP message at an Nth frame. At this time, each mobile station may use the BR header.

The base station recognizes the bandwidths required by the mobile stations via the BR headers and allocates the bandwidths to the mobile stations. The base station allocates the uplink bandwidths to the mobile stations via downlink transmission areas at an N+1th frame. In addition, the mobile stations may transmit data to the base station via the allocated uplink bandwidths at the N+1th frame.

The base station periodically allocates the uplink transmission areas for requesting the bandwidths to the mobile stations. For example, in FIG. 4, since the period is 2 frames, the base station may allocate the resource areas for requesting the uplink bandwidths to the mobile stations at an N+2th frame. At this time, if the uplink data which will be transmitted from the mobile stations to the base station is not present, the process of transmitting the data at an N+3th frame may be omitted.

Referring to FIGS. 1 to 4, in a communication environment in which the number of mobile stations which receive the rtPS is increased in a generally used method, the overhead which occurs in the base station is continuously increased in proportion to the number of mobile stations.

DISCLOSURE OF INVENTION

Technical Problem

In the general broad band radio access system, a base station should allocate a resource area for requesting a bandwidth in order to check whether or not data which will be transmitted from a mobile station which receives the rtPS to the base station is present.

Accordingly, as the number of mobile stations which receives the rtPS is increased, the number of times of transmission of a UL-MAP message which is transmitted from the base station to the mobile station is increased. In addition, the size of the UL-MAP message may be increased in proportion to the number of mobile stations. In addition, since the base station should allocate the downlink again in order to transmit UL-MAP_IE for allocating an uplink resource of each mobile station, the resource is not efficiently used.

An object of the present invention devised to solve the problem lies on a method of efficiently allocating a radio resource to a mobile station to support a real time service.

Another object of the present invention devised to solve the problem lies on a method of allocating a resource area for requesting a bandwidth to a mobile station to support a real time polling service.

Another object of the present invention devised to solve the problem lies on a method of grouping one or more mobile stations and allocating a resource area for requesting a bandwidth to the grouped mobile stations as a predetermined group resource area.

Another object of the present invention devised to solve the problem lies on a method of allocating individual resource areas included in the group resource area to the grouped mobile stations so as to allocate the resource areas for requesting the bandwidths to the mobile stations.

Technical Solution

In order to solve the above-described problems, the present invention relates to a method of efficiently allocating a resource to a mobile station to support a real time service in a radio access system.

The object of the present invention can be achieved by providing a method of allocating a resource to mobile stations to support a real time service, the method including: grouping one or more mobile stations and allocating a group resource area for transmitting request information of bandwidths for transmitting real time service data of the grouped one or more mobile stations; and allocating respective individual resource areas of the one or more mobile stations included in the group resource area.

The method may further include transmitting messages including resource area allocation information including information about the group resource area and information about the individual resource areas to the one or more mobile stations.

The method may further include receiving messages for requesting the bandwidths via the individual resource areas respectively allocated to the one or more mobile stations from the one or more mobile stations using the information about the group resource area and the information about the individual resource areas; and transmitting messages including information about resource areas for transmitting data according to the messages for requesting the bandwidths.

Each of the messages for requesting the bandwidths may include information indicating the size of data which will be transmitted from each of the one or more mobile stations to the base station.

The grouping may include grouping the one or more mobile stations included in a frame of the same time unit. The information about the group resource area may include symbol offset information and the number thereof and subchannel offset information and the number thereof. The information about the individual resource areas may include at least one of a connection identifier type, the number of connection identifiers, a connection identifier and a duration.

In the allocating of the group resource area, the group resource area may be a fixed dedicated channel.

The method may further include transmitting a message including information about the fixed dedicated channel to the one or more mobile stations; and transmitting messages including information about individual resource areas to the one or more mobile stations.

In another aspect of the present invention, provided herein is a method of allocating an uplink resource to mobile stations to support a real time service, the method including: receiving a message including information about a group resource area for transmitting request information of a bandwidth for transmitting real time service data of grouped one or more mobile stations and information about respective individual resource area of the one or more mobile stations included in the group resource area; transmitting a bandwidth request message to a base station via the individual resource area included in the group resource area; and transmitting a message including information about an uplink resource area for transmitting data according to the bandwidth request message.

Advantageous Effects

According to the present invention, the following effects can be obtained.

First, a method of efficiently allocating an uplink resource to a mobile station to support a real time service is provided.

Second, a method of grouping mobile stations which receive a real time service and efficiently allocating an uplink resource is provided. Thus, message overhead can be reduced and the resource can be efficiently used.

Third, although the number of mobile stations which receive a real time polling service (rtPS) is increased, overhead of a message transmitted from a base station to the mobile stations can be reduced compared with a general method.

Fourth, when a dedicated channel is used for requesting an uplink bandwidth, a mobile station transmits only the size of data using a codeword via the dedicated channel. Accordingly, although the number of mobile stations which receive the rtPS is increased, the efficiency of the uplink resource can be improved.

BRIEF DESCRIPTION OF DRAWINGS

The accompanying drawings, which are included to provide a further understanding of the invention, illustrate embodiments of the invention and together with the description serve to explain the principle of the invention.

In the drawings:

FIG. 1 is a view showing an example of a unicast polling method used generally.

FIG. 2 is a view showing a resource allocating method for requesting a bandwidth according to the sequence of frames if the number of mobile stations which receive a real time polling service (rtPS) is one and an uplink resource allocation period is 2.

FIG. 3 is a view showing another example of the unicast polling method used generally.

FIG. 4 is a view showing a resource allocating method according to the sequence of frames if the number of mobile stations which receive an rtPS is two and a polling period is 2.

FIG. 5 is a view showing a method of allocating a resource area for requesting a bandwidth to a mobile station to support a real time service, according to an embodiment of the present invention.

FIG. 6 is a view showing an example of the structure of a BR header used in a step S502 of FIG. 5.

FIG. 7 is a view showing a process of allocating a resource area for requesting a bandwidth using the method of FIG. 5 according to an embodiment of the present invention.

FIG. 8 is a view showing a method of allocating an uplink resource area for requesting a bandwidth to grouped mobile stations according to another embodiment of the present invention.

FIG. 9 is a view showing a method of allocating a resource area for requesting a bandwidth using the method of FIG. 8 according to another embodiment of the present invention.

FIG. 10 is a view showing a method of allocating a resource area for requesting a bandwidth using the method of FIG. 8 according to another embodiment of the present invention.

MODE FOR THE INVENTION

In order to solve the above-described problems, the present invention relates to a method of efficiently allocating a resource to a mobile station to support a real time service in a radio access system.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

The specific terms used in the following description are provided for facilitating the understanding of the present invention, and the use of the specific terms may be variously changed without departing from the technical scope of the present invention.

The above-mentioned embodiments of the present invention are disclosed on the basis of a data communication relationship between a base station and a mobile station. In this case, the base station is used as a terminal node of a network via which the base station can directly communicate with the mobile station. Specific operations to be conducted by the base station in the present invention may also be conducted by an upper node of the base station as necessary.

In other words, it will be obvious to those skilled in the art that various operations for enabling the base station to communicate with the mobile station in a network composed of several network nodes including the base station will be conducted by the base station or other network nodes other than the base station. The term "Base Station" may be replaced with a fixed station, Node-B, eNode-B (eNB), or an access point as necessary. The term "mobile station" may also be replaced with an user equipment (UE), a mobile station (MS) or a mobile subscriber station (MSS) as necessary.

The following embodiments of the present invention can be implemented by a variety of means, for example, hardware, firmware, software, or a combination of them.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so that it can be driven by a processor. The memory unit is located inside or outside of the processor, so that it can communicate with the aforementioned processor via a variety of well-known parts.

The embodiments of the present invention relate to a method of allocating resource areas for requesting bandwidths to one or more mobile stations to support a real time service. In addition, the embodiments of the present invention suggest a method of grouping resource areas of one or more mobile stations and allocating the grouped resource areas. Although uplink is described in the embodiments of the present invention, the present invention is applicable to downlink according to a system request state and a communication environment.

The grouping used in the embodiments of the present invention indicates grouping of one or more mobile stations included in the same information unit (e.g., a frame, a protocol data unit (PDU) or the like). In addition, the resource areas of one or more mobile stations configure one group.

In the embodiments of the present invention, among various scheduling services, for example, a real time polling service (rtPS) will be described. The embodiments of the present invention are applicable to other scheduling services according to a user requirement or a communication environment.

An uplink scheduling type of a mobile station which receives an rtPS may be classified into a method based on a message and a method based on a dedicated channel.

FIG. 5 is a view showing a method of allocating a resource area for requesting a bandwidth to a mobile station to support a real time service, according to an embodiment of the present invention.

Referring to FIG. 5, in a base station (serving BS #1), one or more mobile stations which receive the rtPS may exist. In the present specification, it is assumed that two mobile stations (MS #1 and MS #2) which receive the rtPS exist. In FIG. 5, the same reference numerals denote the same steps, and suffixes a and b respectively denote the identifiers of the messages of the mobile stations.

According to one embodiment of the present invention, the base station may group one or more mobile stations which receive the rtPS and belong to the same frame. At this time, the resource areas for requesting the bandwidths of one or more mobile stations may be grouped so as to form a group resource area. Accordingly, the base station may allocate the group resource area for bandwidth request of all the grouped mobile stations. That is, the base station may allocate a resource area as one uplink channel (burst) for the bandwidth request of the grouped mobile stations.

Accordingly, in FIG. 5, information (UL-BR_IE) for requesting the bandwidth indicates location information of the group resource area of a first mobile station (MS #1) and a second mobile station (MS #2). In addition, the UL-BR_IE may include information about an allocation location of a resource area of each mobile station, a data size and a modulation coding scheme (MCS), which is included in the group resource area.

Accordingly, the base station transmits UL-MAP messages including the UL-BR_IE to the first mobile station (MS #1) and the second mobile station (MS #2) at an Nth frame and allocates the transmission areas for requesting the uplink bandwidths to the mobile stations (S501a and S501b).

Table 1 shows an example of a UL-BR_IE format used in the step S501.

TABLE 1

| Syntax | Size | Note |
| --- | --- | --- |
| UL-BR_IE{ | | |
| Extended-2 UIUC | 4 bits | |
| Length | 8 bits | Length in bytes |
| BR CH use indicator | 1 bit | 0: use BR channel 1: not use BR channel |
| If(BR CH use indicator==0){ | | |
| OFDMA symbol offset | 8 bits | Offset from the start symbol of DL subframe |
| Subchannel offset | 7 bits | |
| Number of OFDMA symbols | 7 bits | |
| Number of Subchannels | 7 bits | |
| } | | |
| RCID_Type | 2 bits | 0b00 = Normal CID 0b02 = RCID 11 0b10 = RCID 7 0b11 = RCID 3 |
| N_RCID | 8 bits | Number of RCID |
| For(j=0; j<N_RCID; j++){ | | |
| RCID | | |
| } | | |
| Duration | 6 bits | In OFDMA slots |
| Repetition coding indication or UIUC | 4 bits | Optional |
| } | | |

Referring to Table 1, an extended-2 uplink interval usage code (hereinafter, an extended-2 UIUC) parameter included in the UL-BR_IE is defined for a mobile station, to which the present invention is applied. A length parameter indicates the length of the UL-BR_IE.

If a bandwidth request channel use indicator (BR CH use indicator) parameter is set to "0", it is indicated that the BR channel (or the BR burst) is used and, if the BR CH use indicator parameter is set to "1", it is indicated that the BR channel is not used.

For example, if the BR CH use indicator parameter is set to "0", the location information of the group resource area of the grouped mobile stations may be represented. That is, information about OFDMA symbol offsets and the number thereof and subchannel offsets and the number thereof is informed to the mobile stations. Each of the mobile stations may recognize the location of the group resource area using the OFDMA symbol offset information and the subchannel offset information included in the UL-BR_IE.

In addition, in table 1, a reduced connection ID (RCID) may be used. At this time, the RCID type (RCID_Type) parameter indicates the type of the RCID. The RCID type which is set to "0b00" indicates a normal CID, the RCID type which is set to "0b01" indicates an RCID using 11 bits, the RCID type which is set to "0b10" indicates an RCID using 7 bits, and the RCID type which is set to "0b11" indicates an RCID using 3 bits.

At this time, an RCID number (N-RCID) parameter indicates the number of mobile stations which receive the rtPS. In addition, a duration parameter indicates the size of an uplink area (e.g., the number of OFDMA slots) allocated to each mobile station.

Accordingly, the grouped mobile stations may recognize the respective resource areas (hereinafter, referred to as individual resource areas) individually allocated to the mobile stations included in the group resource area using the RCID type parameter, the RCID number parameter, the RCID parameter and the duration parameter.

A repetition coding indication or UIUC parameter may be selectively included in the UL-BR_IE and indicates an MCS level corresponding to each mobile station.

That is, each mobile station can recognize the location of the whole group resource area of the grouped mobile stations and recognize the individual resource area of each mobile station included in the group resource area, by receiving the UL-BR_IE of Table 1. Accordingly, each of the grouped mobile stations may request a bandwidth using the individual resource area.

In Table 1, if the BR CH use indicator parameter is set to "1", the UL-BR_IE no longer indicates the group resource area. However, since the parameters indicating the locations of the mobile stations included in the UL-BR_IE are continuously valid, the uplink bandwidth can be requested by the existing method without grouping.

The case of using the group resource area by grouping and setting the MCS level with respect to each mobile station will be described. For example, if two mobile stations receives the group resource area at the same frame using Table 1, the base station may use 64 bits (23 bits+29 bits (location of the group resource area)+(6 bits (duration)+Z (number of mobile stations)*3 bits (in the case of 0b11)) to 94 bits (Z*21 bits (RCID 11 bits+duration 6 bits+UIUC 4 bits)) for the UL-BR_IE. Preferably, about 86 bits may be used.

Accordingly, in one embodiment of the present invention, although the number of mobile stations belonging to the Nth frame is increased, if a plurality of mobile stations is grouped and a resource area for requesting a bandwidth is allocated, it is possible to reduce overhead of a UL-MAP message compared with a general resource area allocating method.

Referring to FIG. 5 again, it is assumed that the first mobile station (MS #1) and the second mobile station (MS #2) have uplink data which will be transmitted to the base station.

Accordingly, each of the mobile stations may request the bandwidth corresponding to a data size using a BR header via the resource area allocated by the base station at the Nth frame (S502a and S502b).

FIG. 6 is a view showing an example of the structure of a BR header structure in the step S502 of FIG. 5.

Referring to FIG. 6, the BR header may preferably have a size of 48 bits. In the structure of the BR header, a HT field (1 bit) indicates the type of the header, and a type field indicates the type of a subheader and a specific payload and has a size of 3 bits. A BR field indicating the size of data may be configured by a BR MSB (11 bits) and a BR LSB (8 bits). The base station may decide the size of the bandwidth, which will be allocated to the mobile station, by checking the BR field.

In addition, the BR header may include CID MSB (8 bits) and CID LSB (8 bits) fields indicating a CID. In addition, a HCS field indicates an error check sequence and is used for error check of the BR header.

Table 2 shows an example of the BR header field.

TABLE 2

| Name | Length (Bits) | Description |
|---|---|---|
| BR | 19 | Bandwidth request. The number of bytes of UL bandwidth requested by ss. The BR for the CID. The request shall not include and PHY overhead. |
| CID | 16 | Connection identifier. |
| EC | 1 | Always set to zero. |
| HCS | 8 | Header check sequence. Same usage as HCS entry. |
| HT | 1 | Header type = 1 |
| Type | 3 | Indicates the type of BR header. |

Referring to FIG. 5 again, the base station which receives the BR headers from the mobile stations can recognize the sizes of the uplink data which will be transmitted by the mobile stations. Accordingly, the base station may transmit UL-MAP (BW allocation) messages to the mobile stations in order to allocate the uplink bandwidths requested by the mobile stations (S503a and 503b).

At this time, in the step S503, the UL-MAP message includes a BW allocation field indicating the uplink bandwidth area. In addition, the UL-MAP message of the step S503 may be transmitted to the mobile stations via a downlink area at an N+1th frame.

The first mobile station (MS #1) and the second mobile station (MS #2) which receive the UL-MAP messages from the base station may transmit respective data to the base station using the uplink bandwidths allocated by the UL-MAP messages (S504a and S504b). The step S504 is performed by the mobile stations using the uplink transmission areas of the N+1th frame.

The steps S501 to S504 of FIG. 5 may be periodically repeated at a polling interval specified in a process (e.g., a DSA process) of generating a service flow.

Accordingly, when the embodiment of the present invention is compared with FIG. 3 showing the general method (e.g. 32*number of rtPS mobile station), in the embodiment of the present invention, although the number of mobile stations which receive the rtPS is increased, the overhead of the downlink message which is transmitted from the base station to the mobile stations can be reduced. In addition, since the step S501 of FIG. 5 is periodically repeated, resource efficiency can be improved.

FIG. 7 is a view showing a process of allocating a resource area for requesting a bandwidth using the method of FIG. 5 according to an embodiment of the present invention.

Referring to FIG. 7, the base station may allocate the uplink resources for requesting the bandwidths to a plurality of mobile stations belonging to the frame at the Nth frame. At this time, the Nth frame is configured by downlink and uplink resource areas.

The base station may transmit the UL-MAP messages including the UL-BR_IE to one or more mobile stations which receive the rtPS in downlink at the Nth frame. At this time, the base station may group one or more mobile stations which exist in the same frame. The UL-BR_IE may include information about the whole group resource area (e.g., BR channel) of the grouped mobile stations. In addition, the UL-BR_IE may include location information of the individual resource area allocated to each mobile station, data size information and MCS level information in the group resource area.

That is, the base station may group one or more mobile stations which receive the rtPS and allocate the group resource area of the grouped mobile station via one BR channel (or BR burst). In addition, the base station may specify the MCS level of data which will be transmitted by the mobile stations and specify the resource areas for the bandwidth request of the mobile stations included in one BR channel.

Accordingly, the mobile stations may recognize the individual resource areas of the mobile stations included in the group resource areas using the RCID type parameter, the RCID number parameter, the RCID parameter and the duration parameter included in the UL-BR_IE (see Table 1). For example, in FIG. 7, the first mobile station (MS #1) is allocated from a first offset of the BR channel, and the uplink resource area of the second mobile station is allocated if the duration of the first mobile station is finished.

By this method, the uplink resource areas may be allocated to the plurality of mobile stations, and the mobile stations may request the bandwidths via the allocated resource areas. Accordingly, the resource area for the bandwidth request of the plurality of grouped mobile stations are set by one group resource area and the individual resource areas of the mobile stations in the group resource area are informed such that the overhead of the MAP message can be reduced compared with the generally used method.

FIG. 8 is a view showing a method of allocating an uplink resource area for requesting a bandwidth to grouped mobile stations according to another embodiment of the present invention.

FIG. 8 shows a method of allocating a resource for requesting a bandwidth to a plurality of grouped mobile stations which receive the rtPS, using a dedicated channel.

Referring to FIG. 8, in a base station (serving BS #1), one or more mobile stations which receive the rtPS may exist. In the present specification, it is assumed that two mobile stations (MS #1 and MS #2) which receive the rtPS exist. In FIG. 8, the same reference numerals denote the same steps, and suffixes a and b respectively denote the identifiers of the messages of the mobile stations.

The base station may fixedly allocate an uplink resource area for requesting the bandwidth to one or more mobile stations which receive the rtPS using the dedicated channel. At this time, one or more mobile stations which receive the rtPS exist in the same frame. Accordingly, the base station may periodically inform each of the mobile stations of the fixed resource area (BR burst or BR channel (BR-CH)) using a UL-MAP message or may inform each of the mobile stations of the fixed resource area whenever the fixed resource area is changed.

Referring to FIG. 8, the base station groups one or more mobile stations and fixedly allocates a portion of the uplink subframe for the bandwidth request of the grouped mobile stations. At this time, the base station (BS #1) may transmit UL-MAP messages including bandwidth request channel information (BR-CH_IE) to a first mobile station (MS #1) and a second mobile station (MS #2) in order to allocate the fixed group resource areas to the mobile stations (S801*a* and S801*b*).

Table 3 shows an example of a BR-CH_IE format used in the step S801.

TABLE 3

| Syntax | Size | Note |
| --- | --- | --- |
| BR channel IE( ){ | | |
| OFDMA symbol offset | 8 bits | |
| Subchannel Offset | 7 bits | |
| No. OFDMA symbols | 7 bits | |
| No. Subchannels | 7 bits | |
| Reserved | 3 bits | |
| } | | |

Referring to Table 3, the BR-CH_IE (BR channel IE) indicates the dedicated group resource area. That is, the base station transmits the BR-CH_IE including OFDMA symbol offsets and the number thereof and subchannel offsets and the number thereof in the fixed group resource area to the mobile stations so as to allocate the fixed group resource area. Accordingly, the mobile stations may recognize the location of the fixed resource area by receiving the UL-BR_IE.

Referring to Table 3, in the step S801, the base station may use 29 bits to 32 bits per mobile station in order to allocate the fixed group resource area via the downlink channel.

Referring to FIG. 8, the base station may inform the mobile stations of the resource areas (individual resource areas) for requesting the bandwidths of the grouped mobile stations using bandwidth request allocation information (BR-Alloc_IE). Accordingly, the base station may transmit the UL-MAP messages including the BR-Alloc_IE to the first mobile station (MS #1) and the second mobile station (MS #2) (S802*a* and S802*b*).

When the mobile stations receive the BR-Alloc_IE in the step S802, the mobile stations may recognize how bandwidth request messages are transmitted via which channel of the fixed dedicated channel (e.g., the BR channel).

Table 4 shows an example of the BR-Alloc_IE (BR allocation IE) used in the step S802.

Referring to Table 4, an extended UIUC parameter included in the BR-Alloc_IE is defined for the mobile station, to which the present invention is applied. In addition, a length parameter indicates the length of the BR-Alloc_IE.

An N_BRCH ID parameter indicates the number of unique bandwidth request channel identifiers. In addition, a report mode parameter indicates the type of a message for requesting the bandwidth to the base station by the mobile station which receives the BR-Alloc_IE. For example, if the report mode is set to "0", the base station may instruct the mobile station to request the bandwidth using the BR header and, if the report mode is set to "1", the base station may instruct the mobile station to transmit only the size of the uplink bandwidth. In the embodiment of the present invention, it is assumed that the report mode is set to "1".

A BRCH ID parameter indicates the unique identifier of a BR channel resource allocated to each mobile station. In addition, an allocation offset parameter indicates the offset location of each mobile station in the fixed group resource area (e.g., BR channel). In addition, a period parameter indicates an allocation period of each mobile station in the fixed group resource area. In Table 4, it is assumed that the allocation period of the mobile station is 2 frames.

Accordingly, each of the grouped mobile stations may check the allocated BR channel using the BRCH_ID parameter, check the offset location using the offset information, and recognize what number frame each of the mobile stations is allocated to using the period parameter.

Referring to FIG. 8 again, the base station may transmit the BR-Alloc_IE to the mobile stations using 39 bits (if the BRCH ID has 8 bits). For example, if the two mobile stations receive the resource areas at the same frame in the step S802, the base station may use 39 bits (17+2 (number of mobile stations)*8 (BRCH ID: 8)+6 (allocation offset)) to 43 bits (17+2*10 (BRCH ID: 10)+6 (allocation offset)) for the transmission of the MAP message in order to allocate the resource.

If the BR-Alloc_IE has periodicity, when the resource areas are allocated to the mobile stations via the dedicated channel (BR channel), the location of the resource area may be informed only at the beginning. If the BR-Alloc_IE does not have periodicity, the base station may periodically transmit the locations of the resource areas to the mobile stations.

In Table 4, if the report mode of the BR-Alloc_IE is set to "1", each mobile station may transmit only the size of the uplink data which will be transmitted to the base station. Accordingly, each mobile station may transmit the size of the

TABLE 4

| Syntax | Size | Note |
| --- | --- | --- |
| BR Allocation IE( ){ | | |
| Extended UIUC | 4 bits | |
| Length | 4 bits | Length of message in bytes (variable) |
| N_BRCH ID | 8 bits | |
| Report mode | 1 bit | 0: BR header1: BR the number of bytes of UL bandwidth requested by the MS. The BR is for the BR ID |
| For(j=0; j<N_BRCH ID; j++) | | |
| BRCH ID | Variable | Index to uniquely identify the BR Channel resource assigned to the MS (3 bits to 9 bits) |
| } | | |
| Allocation offset | 6 bits | |
| Period | 2 bits | Every 2p frames |
| Padding | Variable | The padding bits are used to ensure the IE size is integer number of bytes. Number of bits required to align to byte length, shall be set to zero. |
| } | | | data which will be transmitted by each mobile station via the uplink resource area allocated by the base station in the form of a codeword. That is, the first mobile station (MS #1) and the second mobile station (MS #2) may request the bandwidths using the codewords at the Nth frame via the uplink resource areas allocated by the base station (S803a and S803b).

If the codewords are transmitted via the dedicated channel (BR channel) in the step S803, the size of the data may be transmitted using two slots (11 bits) per mobile station. In FIG. 6, since 48 bits are used when the BR header is transmitted, in FIG. 8, the bandwidth may be requested using a smaller amount of radio resource.

The base station can recognize the sizes of the bandwidths requested by the mobile stations by receiving the codewords from the mobile stations in uplink at the Nth frame. Accordingly, the base station may transmit the UL-MAP messages including the bandwidth allocation information to the mobile stations at the N+1th frame and allocate the bandwidths for data transmission (S804a and S804b).

The mobile stations which receive the uplink bandwidths for data transmission allocated by the base station transmit data to the base station using the area (S805a and S805b).

In the embodiment of the present invention described with reference to FIG. 8, the steps S801 to S805 may be repeated at a polling interval specified by the process (DSA process) of generating the service flow or an interval specified by the BR allocation IE.

FIG. 9 is a view showing a method of allocating a resource area for requesting a bandwidth using the method of FIG. 8 according to another embodiment of the present invention.

Referring to FIG. 9, the base station may group one or more mobile stations belonging to the Nth frame and allocate a resource area for the bandwidth request of the grouped mobile stations as one fixed group resource area (e.g., the BR channel). At this time, the group resource area may be called a dedicated channel or burst.

That is, the base station may generate BR channel information (BR-CH_IE, see Table 3) including the information about the fixed group resource area and transmit MAP messages including BR-CH_IE to the mobile stations.

In addition, the base station may transmit the MAP messages including the BR allocation information (BR-Alloc_IE, see Table 4) to one or more mobile stations belonging to the Nth frame in downlink. That is, the base station may inform the mobile stations of location information of the group resource area of the grouped mobile stations using the BR channel information of Table 3. In addition, the base station may inform the mobile stations of the location information of the individual resource areas of the mobile stations included in the group resource area using the BR allocation information of Table 4.

Accordingly, the grouped mobile stations may request the uplink bandwidth for data transmission via the resource areas allocated by the base station at the Nth frame.

If the method of allocating the resource area for requesting the bandwidth, which is described with reference to FIGS. 8 and 9, is used, the overhead occurring in the network can be reduced compared with the generally used method. In particular, the efficiency of the uplink resource can be improved if the only the size of the BR is requested using the codeword at the time of requesting the bandwidth, without using the BR header.

FIG. 10 is a view showing a method of allocating a resource area for requesting a bandwidth using the method of FIG. 8 according to another embodiment of the present invention.

FIG. 10 shows, for example, the case where the number of mobile stations included in a network is two (MS #1 and MS #2) and a data transmission period set when a service flow is generated is 2. At this time, it is assumed that the mobile stations included in the same group have the same transmission period. Although the number of mobile stations is set to two in order to preferably describe the embodiment of the present invention, the number of mobile stations may be greater than two.

Referring to FIG. 10 the base station may group the first mobile station (MS #1) and the second mobile station (MS #2) which receive the rtPS and belong to the Nth frame, and allocate the group resource area for requesting the bandwidth to the first mobile station (MS #1) and the second mobile station (MS #2). In addition, the base station may include information about the group resource area in the BR channel information (BR-CH_IE) and transmit the BR channel information to the mobile stations.

The base station may transmit the location information of the individual resource area allocated to the mobile stations included in the group resource area to the first mobile station (MS #1) and the second mobile station (MS #2) using the BR allocation information (BR-Alloc_IE).

That is, when the first mobile station (MS #1) receives the BR-CH_IE and the BR-Alloc_IE from the base station, the first mobile station may recognize the fixed group resource area for requesting the bandwidth to the base station and the individual resource area allocated to the first mobile station (MS #1). In addition, the same is true in the second mobile station (MS #2). Accordingly, the mobile stations may request the bandwidth for data transmission to the base station via the respective resource areas allocated at the Nth frame.

The base station which receives the bandwidth request message from the mobile stations at the Nth frame allocates the bandwidths to the first mobile station (MS #1) and the second mobile station (MS #2) at the N+1th frame. The mobile stations may transmit data to the base station via the uplink resource areas allocated by the base station at the N+1th frame.

The process of FIG. 10 may be repeated using the set period. In addition, even when the fixed group resource area is changed, the above-described process may be performed.

Table 5 shows the comparison in the overhead between the general resource allocating method and the resource allocating method according to the embodiments of the present invention according to the number (2, 5, 10 and Z) of the mobile stations.

TABLE 5

| Z_MS per frame | 2(DL) | 5(DL) | 10(DL) | Z(DL) | Z(UL) |
|---|---|---|---|---|---|
| General resource allocating method | 64 bits | 160 bits | 320 bits | Z*32 bits | Z*48 bits |
| Resource allocating method according to an embodiment of the present invention (Message_based_method) | 64-94 bits | 73-157 bits | 88-262 bits | (52 + Z*3 bits + 6 bits) to (52 + Z*21 bits)-3: RCID 3 bits-21: RCID 11 bits, duration 6 bits, UIUC 4 bits | Z*48 bits |

TABLE 5-continued

| Z_MS per frame | 2(DL) | 5(DL) | 10(DL) | Z(DL) | Z(UL) |
|---|---|---|---|---|---|
| Resource allocating method according to another embodiment of the present invention (Dedicated_channel_based_method) | 61-77 bits | 70 to 110 bits | 85-165 bits | BR channel IE + BRAllocation IE32(BR Channel IE) + {23 + Z*3 ? Z*11}} bits-3: BRCH ID 3 bits-11: BRCH ID 9 bits, period 2 bits, BR channel IE period may be longer than BR allocation IE | Z*(11-48) bits |

Referring to Table 5, in the general resource allocating method in downlink (DL), it can be seen that, as the number of mobile stations which receive the rtPS is increased, the overhead is increased in proportion to the number of mobile stations (32*Z). However, in the embodiments of the present invention, it can be seen that, although the number of mobile stations is increased, the overhead is reduced compared with the general method.

That is, in the resource allocating method in downlink (DL) according to the embodiments of the present invention, as the number of mobile stations is increased, the overhead is increased, but the increase ratio of the overhead is significantly reduced compared with the general method.

Accordingly, the overhead of the downlink message which is transmitted from the base station to the mobile stations can be reduced as the number of mobile stations which receive the rtPS is increased, compared with FIG. 3 (32*Z bits) showing the general method. In addition, if the dedicated channel (e.g., the BR channel) is used for requesting the bandwidth by the grouped mobile stations, since only the size of the data can be transmitted, the efficiency of the uplink resource can be improved although the number of mobile stations is increased.

As described above, the embodiments of the present invention receive the method of grouping mobile stations which support a real time service and efficiently allocating an uplink resource so as to efficiently reduce the overhead of a message.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents. In addition, embodiments may be configured by combining claims which do not have an explicit relationship therebetween or new claims may be added by an amendment after the application.

INDUSTRIAL APPLICABILITY

The embodiments of the present invention are applicable to various radio access systems. Examples of various radio access systems include the 3rd generation partnership project (3GPP), the 3GPP2 and/or the institute of electrical and electronic engineers 802 (IEEE 802.xx). The embodiments of the present invention are applicable to all technical fields using the various radio access systems as well as the various radio access systems.

The invention claimed is:

1. A method of allocating a resource to mobile stations to support a real time service, the method comprising:
grouping one or more mobile stations;
allocating a group resource area for transmitting bandwidth request information for transmitting real time service data of the grouped one or more mobile stations;
allocating respective individual resource areas to the one or more mobile stations included in the group resource area; and
transmitting messages including information about the group resource area and information about the individual resource areas respectively allocated to the one or more mobile stations,
wherein the information about the individual resource areas includes a type of a reduced connection identifier, the reduced connection identifier, a number of the reduced connection identifier and a duration,
wherein the reduced connection identifier has a bit size that varies according to the type of the reduced connection identifier, and
wherein the information about the group resource area includes symbol offset information, a number of symbols information, subchannel offset information and a number of subchannels information.

2. The method according to claim 1, further comprising:
receiving messages for requesting bandwidths via the individual resource areas respectively allocated to the one or more mobile stations from the one or more mobile stations using the information about the group resource area and the information about the individual resource areas; and
transmitting messages including information about resource areas for transmitting data according to the messages for requesting the bandwidths.

3. The method according to claim 2, wherein each of the messages for requesting the bandwidths includes information indicating a size of data which will be transmitted from each of the one or more mobile stations to a base station.

4. The method according to claim 1, wherein grouping the one or more mobile stations comprises grouping the one or more mobile stations included in a frame of a same time unit.

5. The method according to claim 1, wherein, in the allocating of the group resource area, the group resource area is a fixed dedicated channel.

6. The method according to claim 5, further comprising:
transmitting a message including information about the fixed dedicated channel to the one or more mobile stations.

7. The method according to claim 6, wherein the information about the individual resource areas further includes a channel identifier for requesting bandwidths of the one or more mobile stations and an allocation period of the individual resource areas.

8. A method of allocating an uplink resource to mobile stations to support a real time service, the method comprising:
receiving a message including information about a group resource area for transmitting request information of a bandwidth for transmitting real time service data of a group of one or more mobile stations and information about individual resource areas respectively allocated to the one or more mobile stations included in the group resource area;

transmitting a bandwidth request message to a base station via the individual resource areas included in the group resource area; and transmitting a message including information about an uplink resource area for transmitting data according to the bandwidth request message, wherein the information about the individual resource areas includes a type of a reduced connection identifier, the reduced connection identifier, a number of the reduced connection identifier and a duration, wherein the reduced connection identifier has a bit size that varies according to the type of the reduced connection identifier, and wherein, in the receiving of the message, the message further includes a size of the data of each of the one or more mobile stations and modulation coding scheme (MCS) information.

9. The method according to claim 8, wherein the bandwidth request message includes information indicating a size of the data which will be transmitted to the base station.

10. The method according to claim 8, wherein the group resource area is allocated using a fixed dedicated channel.

* * * * *